US012693130B2

(12) United States Patent　　　　　(10) Patent No.:　US 12,693,130 B2
Lerner　　　　　　　　　　　　　　　　(45) Date of Patent:　　　Jul. 28, 2026

(54) SYSTEMS, METHODS AND VEHICLES FOR ANOMALOUS DRIVING CONDITION DETECTION AND MAP UPDATING

(71) Applicant: Toyota Jidosha Kabushiki Kaisha, Aichi-ken (JP)

(72) Inventor: Emily Lerner, Ypsilanti, MI (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 208 days.

(21) Appl. No.: 18/422,728

(22) Filed: Jan. 25, 2024

(65) Prior Publication Data

US 2025/0244138 A1　　Jul. 31, 2025

(51) Int. Cl.
　　　*B60W 60/00*　　　(2020.01)
　　　*B60W 50/14*　　　(2020.01)
　　　*G01C 21/00*　　　(2006.01)
(52) U.S. Cl.
　　　CPC ......... *G01C 21/3807* (2020.08); *B60W 50/14* (2013.01); *B60W 60/001* (2020.02); *G01C 21/3841* (2020.08); *G01C 21/3896* (2020.08); *B60W 2050/146* (2013.01); *B60W 2556/40* (2020.02); *B60W 2556/45* (2020.02)
(58) Field of Classification Search
　　　None
　　　See application file for complete search history.

(56) References Cited

U.S. PATENT DOCUMENTS 10,373,002 B2　8/2019　Kwant et al.
11,087,469 B2　8/2021　Mittal et al.

11,501,104 B2　11/2022　Ung et al.
11,685,431 B2 *　6/2023　Al Assad ............... B62D 6/003
　　　　　　　　　　　　　　　　　　　　701/41
12,017,659 B2 *　6/2024　Mukundan ............. G08G 1/164
12,423,788 B2 *　9/2025　Mahadevan .............. G06T 7/11
2017/0031361 A1 *　2/2017　Olson .................... G06V 20/56
2021/0407313 A1 *　12/2021　Urano ............... B60W 50/0225
2022/0126878 A1 *　4/2022　Moustafa .......... B60W 60/0013
2022/0161816 A1 *　5/2022　Gyllenhammar ...... G06N 20/00
2023/0050402 A1　2/2023　Keski
2024/0135305 A1 *　4/2024　Caron ................... G05D 1/693

FOREIGN PATENT DOCUMENTS

CN　　　　　111824167 B　　6/2022

* cited by examiner

*Primary Examiner* — Daniel L Greene
*Assistant Examiner* — Robert L Pinkerton
(74) *Attorney, Agent, or Firm* — DINSMORE & SHOHL LLP

(57)　　　　　　ABSTRACT

Systems, methods and vehicles for detecting anomalous driving conditions are disclosed. In one embodiment, a method includes receiving vehicle sensor data from a vehicle, where a portion of the vehicle sensor data is non-geospatial data, inputting the vehicle sensor data into a trained model that is trained to detect anomalous driving conditions, when an output of the trained model indicates an anomalous driving condition, comparing the vehicle sensor data associated with the anomalous driving condition with vehicle sensor data of one or more additional vehicles according to a metric, and when the metric is satisfied, marking a segment of a map corresponding with the vehicle data associated with the anomalous driving condition, and transmitting map data associated with the map to the vehicle.

19 Claims, 7 Drawing Sheets

SYSTEMS, METHODS AND VEHICLES FOR ANOMALOUS DRIVING CONDITION DETECTION AND MAP UPDATING

BACKGROUND

Navigation applications support providing navigation routes to drivers. Traffic data is aggregated such that traffic data for a segment (e.g., a defined subdivision of a road) can be used to infer real time conditions across that segment, such as travel times and traffic data. Some navigation applications also solicit direct user feedback to solicit the current conditions of the road. However, this usually requires affirmative interaction with a driver and there is no guarantee that users of such a navigation application may frequent all segments of a route that may be used by, for example, an autonomous vehicle.

Accordingly, alternative systems and methods for gathering data for providing navigation data to users may be desired.

BRIEF SUMMARY

In one embodiment, a method includes receiving vehicle sensor data from a vehicle, where a portion of the vehicle sensor data is non-geospatial data, inputting the vehicle sensor data into a trained model that is trained to detect anomalous driving conditions, when an output of the trained model indicates an anomalous driving condition, comparing the vehicle sensor data associated with the anomalous driving condition with vehicle sensor data of one or more additional vehicles according to a metric, and when the metric is satisfied, marking a segment of a map corresponding with the vehicle data associated with the anomalous driving condition, and transmitting map data associated with the map to the vehicle.

In another embodiment, a computing apparatus includes one or more processors. The computing apparatus also includes a non-transitory memory storing instructions that, when executed by the one or more processors, configures the apparatus to receive vehicle sensor data from a vehicle, where a portion of the vehicle sensor data is non-geospatial data, input the vehicle sensor data into a trained model that is trained to detect anomalous driving conditions, when an output of the trained model indicates an anomalous driving condition, compare the vehicle data associated with the anomalous driving condition with vehicle data of one or more additional vehicles according to a metric, and when the metric is satisfied, mark a segment of a map corresponding with the vehicle data associated with the anomalous driving condition, and transmitting map data associated with the map to the vehicle.

In another embodiment, a vehicle includes a plurality of sensors for producing vehicle data, where a portion of the vehicle data is non-geospatial data, a communications module that transmits the vehicle data to a remote server and receives map data from the remote server, where the map data includes one or more marked segments corresponding to one or more anomalous driving conditions associated with the vehicle data and vehicle data associated with an or more additional vehicles, and a user interface device that displays the map data including the one or more marked segments.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Embodiments of the present disclosure are directed to systems, methods and vehicles for detecting anomalous driving conditions and updating map data accordingly when one or more anomalous driving conditions are detected. The anomalous driving conditions are detected using non-geospatial vehicle sensor data, such as speedometer data, steering wheel position data and the like. When an anomalous driving condition is detected, and a metric is satisfied, a segment of a map may be marked so that the segment may be avoided. In one non-limiting example, the anomalous driving condition is detected by using a trained model, and the metric is a threshold percentage of vehicles reporting an anomalous driving condition at a particular location.

Figure 1:
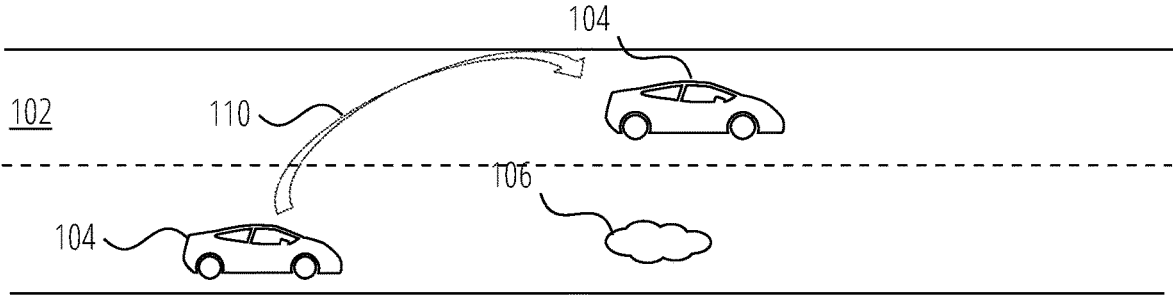
FIG. 1 illustrates an environment in accordance with embodiments of the present disclosure.

Referring now to FIG. 1, a vehicle 104 is illustrated driving on a road 102. In this example, there is an obstacle 106 in the right lane of the road 102. The obstacle 106 may be a pothole, for example, or some object that is within the road 102 and should be avoided by the vehicle 104. At a first point in time, the vehicle 104 is in the right lane of the road 102 but then changes to the left lane to avoid the obstacle 106, as shown by arrow 110. The obstacle 106 causes vehicle sensor data of the various sensors associated with the vehicle that is indicative of an anomalous driving condition to avoid the obstacle 106 to be generated. The anomalous driving condition may be any vehicle maneuver, such as one or more of swerving, changing lanes, slowing down, applying brakes, speeding up, vibrations due to hitting on object, and/or the like. Thus, the vehicle sensor data is indicative of an anomalous driving condition.

Figure 2:
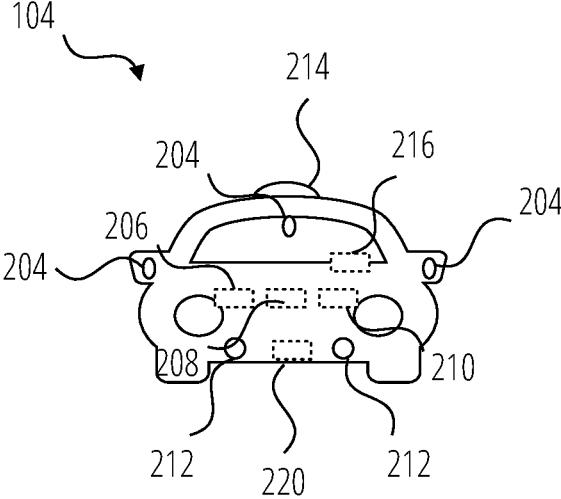
FIG. 2 illustrates an example vehicle according to one or more embodiments described and illustrated herein.

Referring now to FIG. 2, example vehicle 104 is schematically illustrated to show various vehicle sensors. It should be understood that FIG. 2 is for illustrative purposes only, and vehicle 104 may have different sensors than what is shown in FIG. 2. Vehicle 104 has a plurality of camera sensors 204 in various locations, such as on the side mirrors, in the windshield, on the side of the vehicle body, in the rear, and/or the like. The camera sensors camera sensor 204 produces video data used by the vehicle 104 for vehicle functions, such as obstacle avoidance or autonomous driving. Vehicle 104 has proximity sensor 212 in its front as well as its rear that detect the proximity of the vehicle to an object. The proximity sensors proximity sensor 212 may be infrared sensors, for example. Vehicle 104 further includes a lidar sensor 214 that produces lidar signals to detect objects within the environment by way of a point cloud. Additional sensors include a speedometer 206, brake sensor 220, a steering wheel position sensor 216, an inertial measurement unit 208 (IMU) such as an accelerometer, and a GPS sensor. It should be understood that other sensors may also be provided, such as a steering wheel position sensor and a radar sensor. At least a portion of the vehicle sensor data is non-geospatial data, meaning that it does not produce locational data on its own. It should be understood that geospatial data may be included in the vehicle sensor data, such as GPS location data.

The vehicle sensor suite collectively produce vehicle sensor data as the vehicle 104 traverses the environment, such as on the road 102. When the vehicle 104 performs an anomalous driving condition, such as avoiding an obstacle 106, the vehicle sensors produce vehicle sensor data indicative of the anomalous driving condition. In the example of FIG. 1, the anomalous driving condition may include swerving, applying brakes and slowing down. The vehicle sensor data produces data indicative of the anomalous driving condition.

In embodiments of the present disclosure, vehicle sensor data from many vehicles are collected to determine where anomalous driving conditions are frequently occurring so that map data may be updated to reflect the causes of the anomalous driving conditions. For example, segments of a map may be closed so that vehicles may be re-routed, or warnings may be issued to drivers or autonomous vehicle so that the causes of the anomalous driving conditions can be avoided.

Figure 3:
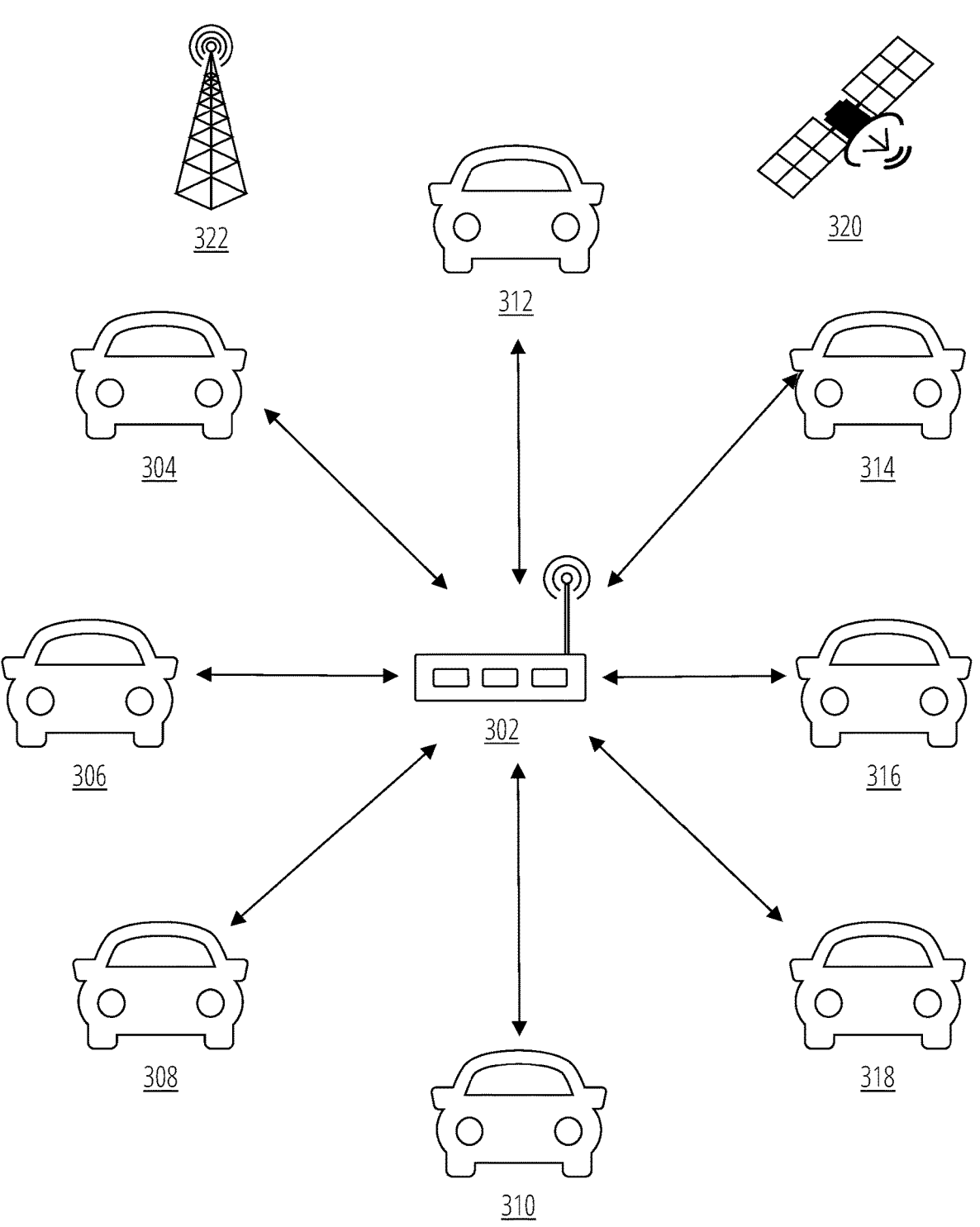
FIG. 3 illustrates a plurality of vehicles communicating with a remote server according to one or more embodiments described and illustrated herein.

Referring now to FIG. 3, a plurality of vehicles (represented by vehicles 304, 306, 308, 310, 312, 314, 316, and vehicle 318) send and receive the vehicle sensor data to one or more remote server 302 by way of communication networks (e.g., satellite networks 320, cellular network 322, vehicle-to-vehicle networks, vehicle-to-infrastructure networks, and/or other wireless communication networks). There may be thousands or millions of vehicles contributing vehicle sensor data to the remote servers 302 which, as described in more detail below, are used to detect anomalous driving conditions and therefore segments of the road 102 having an issue, such as an obstacle 106 in the road 102.

Each vehicle may send all or a sub-set of its vehicle sensor data generated by its sensors. As described in more detail below, the system (e.g., the one or more remote servers 302) processes the vehicle sensor data from a plurality of vehicles to determine whether or not the vehicle sensor data is indicative of anomalous driving conditions and, if a certain threshold of vehicles are sending vehicle sensor data indicative of anomalous driving condition at a particular location, marking a segment of a map encompassing that particular location. Individual vehicles can utilize the marked data to take action with respect to the marked segment, such as rerouting the vehicle, or displaying a notification regarding the segment on a user interface device, such as a head unit of a vehicle infotainment system.

Figure 4:
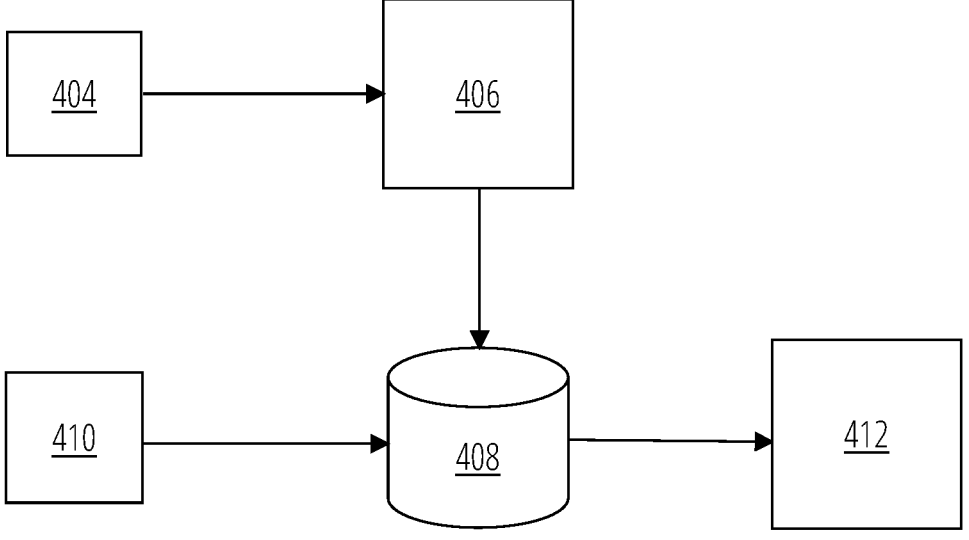
FIG. 4 illustrates an example system for detecting an anomalous driving condition according to one or more embodiments described and illustrated herein.

The vehicle sensor data can be analyzed to determine it is indicative of an anomalous driving condition in a variety of ways. As a non-limiting example, a trained model is used to determine if the vehicle sensor data presents an anomalous driving condition. Referring now to FIG. 4, an example system for processing vehicle sensor data to determine if it presents an anomalous driving condition is illustrated. The system illustrated by FIG. 4 includes a trained model 408. Training data 404 in the form of historic vehicle sensor data and/or simulated vehicle sensor data is provided as input into a training algorithm 406 used to produce the trained model 408. The training algorithm 406 may be a supervised machine learning algorithm wherein the training data 404 comprises vehicle sensor data having labels indicating one or more anomalous driving conditions. As a non-limiting example, the training algorithm 406 may be a classifier. Any known or yet-to-be-developed classifier may be utilized. The training data may include vehicle sensor data labeled as a swerve, hard-braking, slowing down, changing lanes, and the like.

The training algorithm 406 is utilized to train the trained model 408 using the training data 404 to determine whether or not input vehicle sensor data 410 is indicative of an anomalous driving condition and, if so, the particular type of anomalous driving condition. Once trained, the trained model 408 is deployed for use by the plurality of vehicles, which send vehicle sensor data 410 in real time as input to the trained model 408. For each of the inputs, the trained model 408 produces an output prediction 412, such as no anomalous driving condition, an anomalous driving condition detected and, in some embodiments, the type of anomalous driving condition if an anomalous driving condition is detected.

Therefore, many thousands of vehicles are reporting vehicle sensor data and, in some cases, anomalous driving conditions. This information can be used to update map data to warn other drivers of the causes of anomalous driving conditions.

Figure 5:
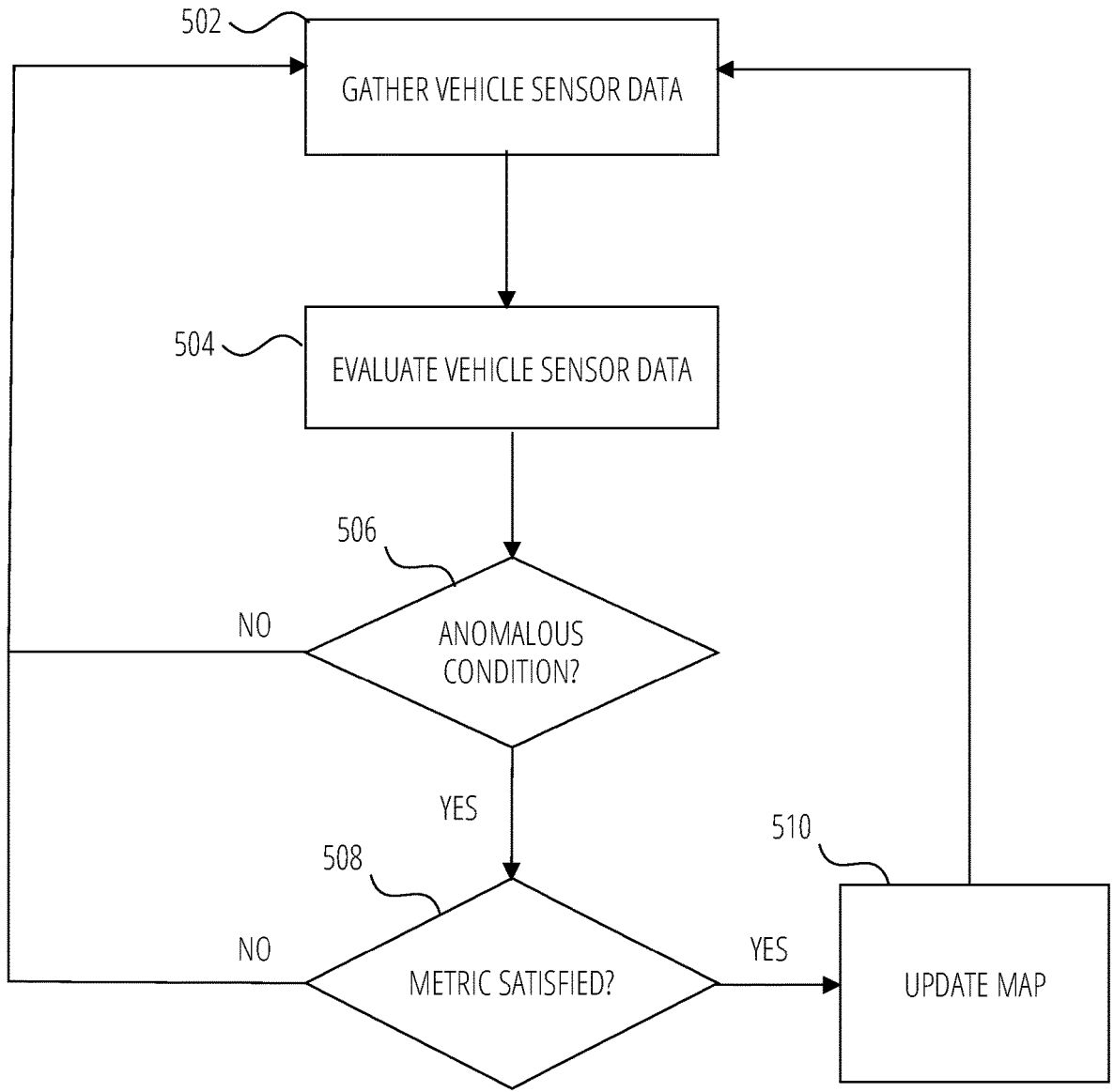
FIG. 5 illustrates an example process for detecting an anomalous driving condition and updating map data according to one or more embodiments described and illustrated herein

Referring now to FIG. 5, an example method for detecting anomalous driving conditions and updating map data is illustrated. At block 502, vehicle sensor data is gathered and received, such as by a remote server. The vehicle sensor data is generated from a plurality of vehicles on various roads. The vehicle sensor data may be temporally stored in one or more data storage components, and may be anonymous to the remote server. As stated above, the vehicle sensor data may be data generated by any number of sensors on the vehicle.

At block 504 the vehicle sensor data is analyzed to detect whether or not it is indicative of an anomalous driving condition. As a non-limiting example, the vehicle sensor data may be inputted into a trained model 408 trained to detect anomalous driving conditions from inputted vehicle sensor data. In some embodiments, the trained model 408 is stored at one or more remote servers such that the vehicle sensor data is transmitted to the remote server(s) which then uses the trained model 408 to determine whether or not an anomalous driving condition is present. In other embodiments, the trained model 408 is stored at the vehicle, and the vehicle then transmits the output of the trained model to one or more remote servers.

At block 506 it is evaluated whether or not an anomalous driving condition was detected. For example, it is evaluated whether or not the output of the trained model 408 is an anomalous driving condition. If the answer is NO at block 506, the process moves back to block 502 where vehicle sensor data is continuously gathered.

If the answer is YES at block 506, the process moves to block 508 where it is determined as to whether or not a metric for updating the map data is satisfied. Embodiments are not limited to any particular metric. As a non-limiting example, the metric includes determining a percentage of vehicles reporting an anomalous driving condition at the same geographic location (e.g., a certain portion/segment of an individual road), and comparing that percentage against a threshold percentage. The metric is satisfied when the percentage of vehicles reporting an anomalous driving condition is greater than the threshold percentage. Another metric may be a number of vehicles reporting an anomalous driving condition. Other metrics may also be utilized.

When the metric is not satisfied at block 508, the process moves back to block 502 where vehicle sensor data is gathered. When the metric is satisfied at block 508, the process moves to block 510. At block 510 the map data is updated in some way in response to there being an anomalous driving condition at a particular location within the map. The purpose of updating the map is to account for any anomalous driving conditions such that they can be avoided or accounted for in some way. Depending on the type of anomalous driving condition, a segment of road encompassing the anomalous driving condition may be closed, such that the vehicle navigation system will re-route the vehicle to avoid the closed segment. This may be reflected by a user interface device of the vehicle displaying updated directions. In the case of a fully autonomous vehicle, the vehicle computer will control the vehicle to autonomous traverse a route that avoids the closed segment. In another example, the segment encompassing the anomalous driving condition may not be closed but rather a warning regarding the anomalous driving condition may be associated with the segment. For example, the segment may be highlighted or otherwise visually changed to represent that there is an issue at that part of the road. An audio message regarding the issue may be played, or a textual message may be displayed on the vehicle user interface device.

The process continues from block 510 back to block 502 where more vehicle sensor data is gathered.

Figure 6:
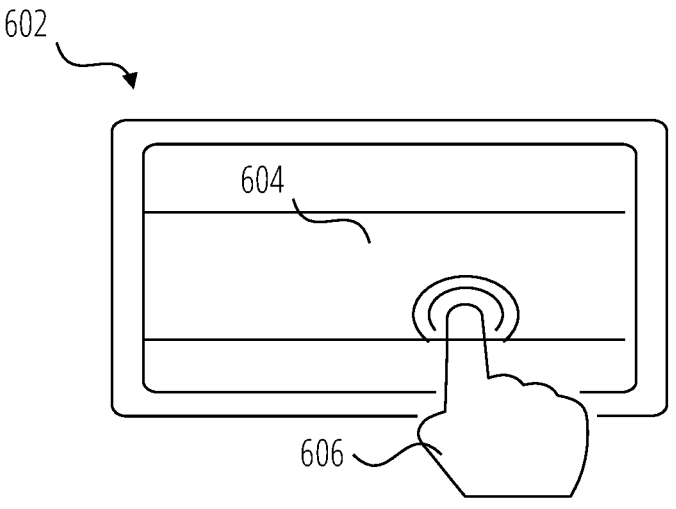
FIG. 6 illustrates an example user interface device of a vehicle according to one or more embodiments described and illustrated herein.

FIG. 6 illustrates an example user interface device 602 that displays map data. As an example, the user interface device 602 may be a touch screen of a vehicle infotainment system. The user interface device 602 of FIG. 6 is illustrating a segment 604 of a road. The segment 604 may have an anomalous driving condition associated therewith, for example. In some embodiments, a user 606 may utilize a touch-screen of the user interface device 602 to select the segment 604 to get more information on the cause of the reported anomalous driving condition.

Figure 7:
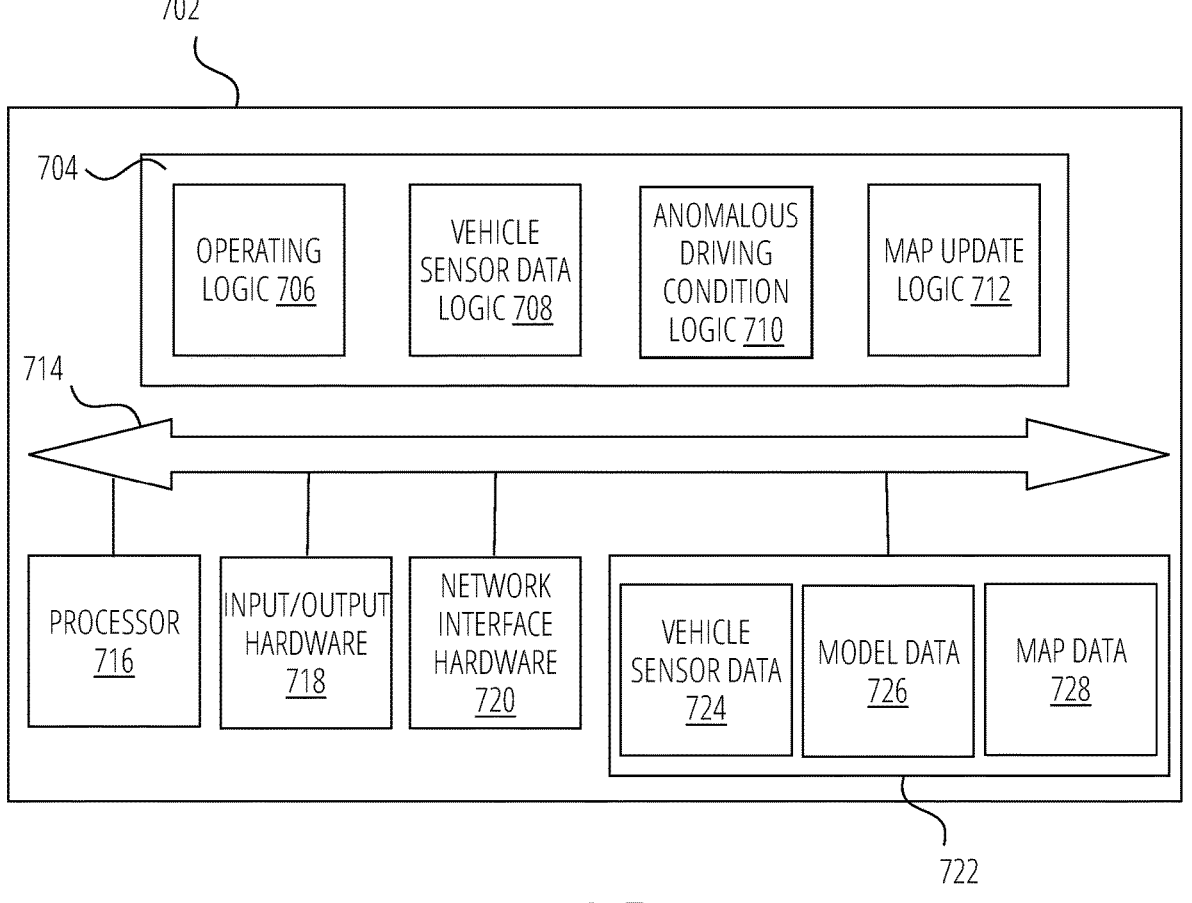
FIG. 7 illustrates an example computing device for detecting anomalous driving conditions and updating map data according to one or more embodiments described and illustrated herein.

Embodiments of the present disclosure may be implemented by a computing device, and may be embodied as computer-readable instructions stored on a non-transitory memory device. Referring now to FIG. 7, an example system for detecting anomalous driving conditions is illustrated. The example computing device 702 provides a system for detecting anomalous driving conditions, and/or a non-transitory computer usable medium having computer readable program code for detecting anomalous driving conditions embodied as hardware, software, and/or firmware, according to embodiments shown and described herein. While in some embodiments, the computing device 702 may be configured as a general purpose computer with the requisite hardware, software, and/or firmware, in some embodiments, the computing device 702 may be configured as a special purpose computer designed specifically for performing the functionality described herein. The computing device 702 may be a remote server (e.g., the remote server 302 shown in FIG. 3) or it may be a computing device of an individual vehicle. It should be understood that the software, hardware, and/or firmware components depicted in FIG. 7 may also be provided in other computing devices external to the computing device 702 (e.g., data storage devices, remote server computing devices, and the like).

As also illustrated in FIG. 7, the computing device 702 (or other additional computing devices) may include a processor 716, input/output hardware 718, network interface hardware 720, a data storage component 722 (which may include vehicle sensor data 724 (e.g., data generated by sensors of one or more vehicles), model data 726 (e.g., data regarding the trained model 408), map data 728 (e.g., any data defining the map, including marked segments associated with an anomalous driving condition) and any other data for performing the functionalities described herein), and a non-transitory memory component 704. The memory component 704 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components.

Additionally, the memory component 704 may be configured to store operating logic 706, vehicle sensor data logic 708 for receiving vehicle sensor data from a plurality of vehicles, anomalous driving condition logic 710 for evaluating vehicle sensor data for an anomalous driving condition and metric evaluation, and map update logic 712 for updating map data 728 (each of which may be embodied as computer readable program code, firmware, or hardware, as an example). It should be understood that the data storage component 722 may reside local to and/or remote from the computing device 702, and may be configured to store one or more pieces of data for access by the computing device 702 and/or other components.

A local interface 714 is also included in FIG. 7 and may be implemented as a bus or other interface to facilitate communication among the components of the computing device 702.

The processor 716 may include any processing component configured to receive and execute computer readable code instructions (such as from the data storage component 722 and/or memory component 704). The input/output hardware 718 may include one or more of graphics display device, keyboard, mouse, printer, camera, microphone, speaker, touch-screen, and/or other device for receiving, sending, and/or presenting data. The network interface hardware 720 may include any wired or wireless networking hardware, such as a modem, LAN port, wireless fidelity (Wi-Fi) card, WiMax card, mobile communications hardware, and/or other hardware for communicating with other networks and/or devices. The network interface hardware 720 may communicate via the Internet to receive vehicle sensor data or other data.

Included in the memory component 704 may be the operating logic 706, vehicle sensor data logic 708, anomalous driving condition logic 710, and map update logic 712. The operating logic 706 may include an operating system and/or other software for managing components of the computing device 702. Similarly, the vehicle sensor data logic 708 may reside in the memory component 704 and may be configured to receive and process vehicle sensor data from a plurality of vehicles. The anomalous driving anomalous driving condition logic 710 also may reside in the memory component 704 and may be configured to detect anomalous driving conditions (e.g., using a trained model) as well as apply a metric to determine if map data should be updated. The map update logic includes logic to update various map segments having anomalous driving conditions.

The components illustrated in FIG. 7 are merely exemplary and are not intended to limit the scope of this disclosure. More specifically, while the components in FIG. 7 are illustrated as residing within the computing device 702.

It should now be understood that embodiments of the present disclosure are directed to systems, methods and vehicles for detecting anomalous driving conditions and updating map data accordingly when one or more anomalous driving conditions are detected. The anomalous driving conditions are detected using non-geospatial vehicle sensor data, such as speedometer data, steering wheel position data and the like. When an anomalous driving condition is detected, and a metric is satisfied, a segment of a map may be marked so that the segment may be avoided. In one non-limiting example, the anomalous driving condition is detected by using a trained model, and the metric is a threshold percentage of vehicles reporting an anomalous driving condition at a particular location. Thus, embodiments improve detection of route information about infrastructure changes that affect driving conditions based on changes in vehicle operation at any given location.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   receiving vehicle sensor data from a vehicle, wherein a portion of the vehicle sensor data is non-geospatial data;
   inputting the vehicle sensor data into a trained model that is trained to detect anomalous driving conditions;
   when an output of the trained model indicates an anomalous driving condition, comparing the vehicle sensor data associated with the anomalous driving condition with vehicle sensor data of one or more additional vehicles according to a metric; and
   when the metric is satisfied, marking a segment of a map corresponding with the vehicle data associated with the anomalous driving condition, transmitting map data associated with the map to the vehicle, and controlling the vehicle to avoid the marked segment of the map.

2. The method of claim 1, wherein the metric comprises a threshold percentage of additional vehicles reporting the anomalous driving condition.

3. The method of claim 1, wherein marking the segment of the map comprises closing the segment of the map.

4. The method of claim 1, wherein the marking of the segment is configured to generate a notification about the segment within the vehicle.

5. The method of claim 1, wherein the vehicle sensor data comprises at least one of accelerometer data, steering wheel position data, speedometer data, and braking data.

6. The method of claim 1, wherein the anomalous driving condition comprises a swerving maneuver.

7. The method of claim 1, further comprising unmarking the segment of the map when the metric is no longer satisfied.

8. A computing apparatus comprising:
   one or more processors; and a non-transitory memory storing instructions that, when executed by the one or more processors, configure the apparatus to:
   receive vehicle sensor data from a vehicle, wherein a portion of the vehicle sensor data is non-geospatial data;
   input the vehicle sensor data into a trained model that is trained to detect anomalous driving conditions;
   when an output of the trained model indicates an anomalous driving condition, compare the vehicle data associated with the anomalous driving condition with vehicle data of one or more additional vehicles according to a metric; and
   when the metric is satisfied, mark a segment of a map corresponding with the vehicle data associated with the anomalous driving condition, transmitting map data associated with the map to the vehicle, and controlling the vehicle to avoid the marked segment of the map.

9. The computing apparatus of claim 8, wherein the metric comprises a threshold percentage of additional vehicles report the anomalous driving condition.

10. The computing apparatus of claim 8, wherein marking the segment of the map comprises closing the segment of the map.

11. The computing apparatus of claim 8, wherein the marking of the segment is configured to generate a notification about the segment within the vehicle.

12. The computing apparatus of claim 8, wherein the vehicle sensor data comprises at least one of accelerometer data, steering wheel position data, speedometer data, and brake data.

13. The computing apparatus of claim 8, wherein the instructions further configure the apparatus to unmark the segment of the map when the metric is no longer satisfied.

14. A vehicle comprising:
   a plurality of sensors for producing vehicle data, wherein a portion of the vehicle data is non-geospatial data;
   a communications module that transmits the vehicle data to a remote server and receives map data from the remote server, wherein the map data comprises one or more marked segments corresponding to one or more anomalous driving conditions associated with the vehicle data and vehicle data associated with an or more additional vehicles, wherein:
   the remote server inputs the vehicle sensor data into a trained model that is trained to detect anomalous driving conditions;
   when an output of the trained model indicates an anomalous driving condition, the remote server compares the vehicle data associated with the anomalous driving condition with vehicle data of one or more additional vehicles according to a metric; and
   when the metric is satisfied, the remote server marks a segment of a map corresponding with the vehicle data associated with the anomalous driving condition, and transmitting map data associated with the map to the vehicle; and
   a user interface device that displays the map data including the one or more marked segments.

15. The vehicle of claim 14, wherein the metric comprises a threshold percentage of additional vehicles report the anomalous driving condition.

16. The vehicle of claim 14, wherein marking the segment of the map comprises closing the segment of the map.

17. The vehicle of claim 14, wherein the instructions further configure the apparatus to unmark the segment of the map when the metric is no longer satisfied.

18. The vehicle of claim 14, wherein the vehicle sensor data comprises at least one of accelerometer data, steering wheel position data, speedometer data, and brake data.

19. The vehicle of claim 14, further comprising an autonomous driving unit that autonomously reroutes the vehicle based on the map data received from the remote server.

* * * * *